UNITED STATES PATENT OFFICE.

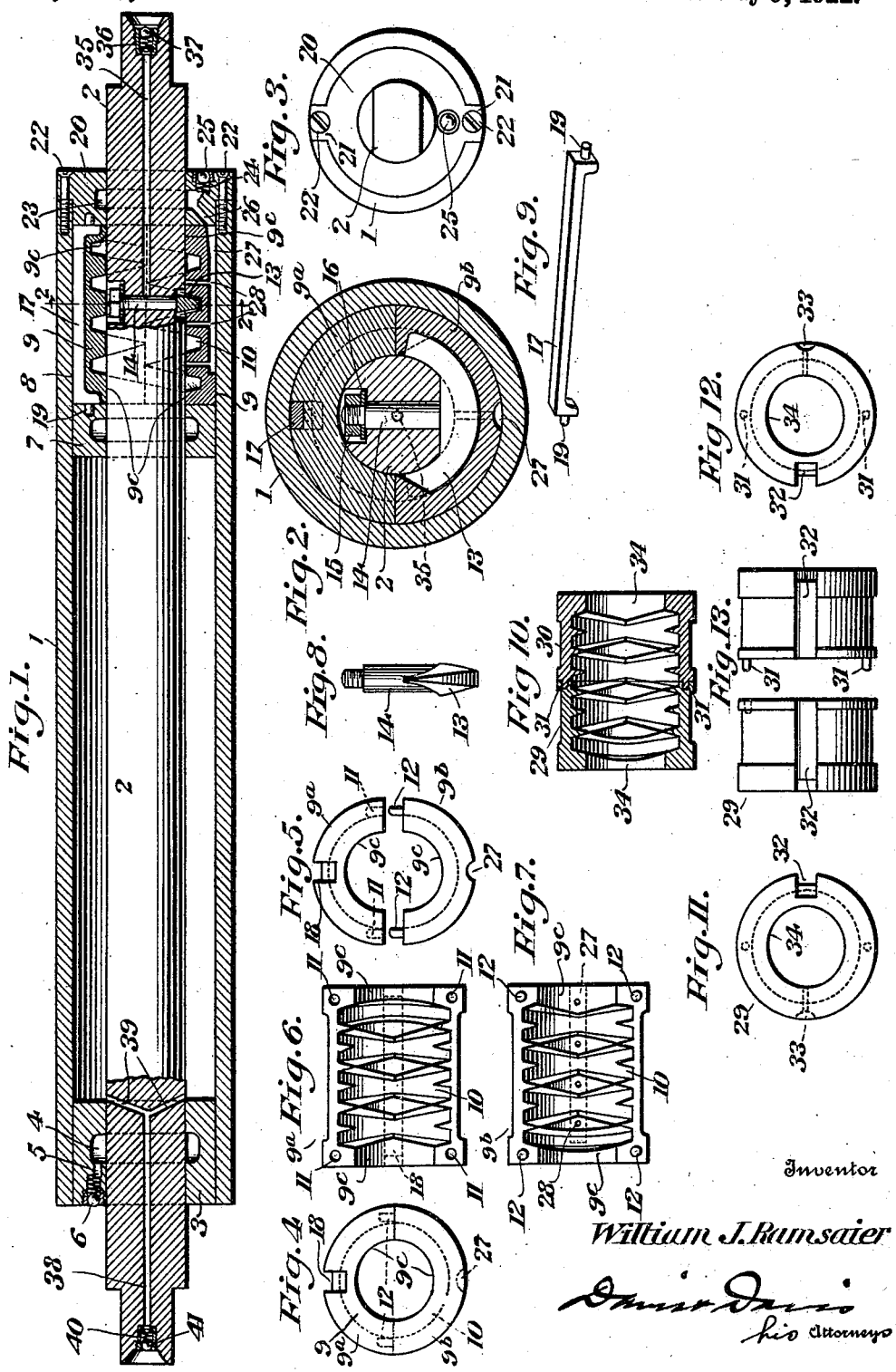

WILLIAM JACOB RAMSAIER, OF NEW YORK, N. Y.

INK DISTRIBUTOR.

1,415,480.	Specification of Letters Patent.	Patented May 9, 1922.

Application filed July 5, 1921. Serial No. 482,488.

*To all whom it may concern:*

Be it known that I, WILLIAM J. RAMSAIER, a citizen of the United States, and resident of the borough of Manhattan, city, county, and State of New York, have invented certain new and useful Improvements in Ink Distributors, of which the following is a specification.

This invention relates to improvements in ink distributors for printing presses and the like, of the type shown in Patent No. 1,239,129, dated September 4, 1917.

The main object of this invention is to provide a sectional or split sleeve adapted to fit within the interior of the distributor roll and having a duplex thread on its inner surface in which a crescent shape switch carried by the distributor-roll supporting shaft operates to impart a reciprocating motion to the roll upon the shaft when the roll is rotated about the shaft. The sleeve is so constructed that the duplex internal thread is complete within the sleeve, the threads being closed at both ends of the sleeve; and the purpose of splitting the sleeve, or making it sectional, is to permit its being assembled over the crescent switch. Heretofore, internally threaded sleeves of this character have been made open-ended so that the crescent switch could be threaded into it through one of its open ends. This type of sleeve required some form of closure device in order to bring about the reversal of the direction of movement of the switch in the duplex thread when the switch reached the end of the thread moving in one direction. It is the object of this invention to so construct the sleeve that the ends of the threads will be closed and the reversal of the direction of movement of the switch will be brought about by the said closed ends. Of course, the sleeve is open at its ends to permit it to be passed over the roll-supporting shaft, but the threads are closed at the ends of the sleeve.

Another object of the invention is to provide means for locking the sectional sleeve together and to the roll so that the sections of the sleeve cannot move with respect to each other nor with respect to the roll.

Another object of the invention is to provide improved means for introducing oil, or other lubricant, into the threads of the sleeve and also into the bearings of the roll on the shaft.

In the drawing, Fig. 1 is a longitudinal sectional view of a distributing roll, its supporting shaft being shown in elevation;

Fig. 2 a transverse sectional view of the distributing roll on a slightly enlarged scale taken on the line 2—2 of Fig. 1;

Fig. 3 an end elevation of the distributing roll and its supporting shaft;

Fig. 4 an end elevation of the internally threaded sleeve formed in two longitudinal sections;

Fig. 5 a view similar to Fig. 4 showing the two parts of the sleeve slightly separated;

Fig. 6 an elevation of half of the internally threaded sleeve showing the inner side thereof;

Fig. 7 a view similar to Fig. 6 showing the inner side of the other half of the threaded sleeve;

Fig. 8 an edge view of the crescent switch;

Fig. 9 a detail view of the key for locking the sectional sleeve to the distributor roll;

Fig. 10 a longitudinal sectional view of the internally threaded sleeve divided transversely into two sections;

Fig. 11 a view of the end of the sleeve shown in Fig. 10;

Fig. 12 a view similar to Fig. 11 showing the other end of the sleeve illustrated in Fig. 10; and Fig. 13 a side elevation of the sleeve shown in Fig. 10, the two sections being slightly separated.

Referring to the parts by numerals, 1 designates the ink distributor roll which is loosely mounted on a shaft 2. The shaft 2 may be supported in the press frame in any suitable manner and is held against rotation by any suitable means. The roll 1 is provided at one end, the left-hand end as viewed in the drawing, with a suitable bearing 3 adapted to receive the shaft 2. The bearing 3 is preferably a ring of suitable bearing metal forced into the roll and rigidly and permanently connected thereto. This bearing is formed with a central oil cavity 4 open to the shaft and designed to deliver oil thereto, and with which communication may be had through a passage 5 extending to the outer end surface of the bearing. In this passage is arranged a spring-pressed ball valve 6. In the roll, near the right-hand end as viewed in the drawing, is inserted a bearing 7, said bearing consisting of a ring of suitable bearing metal forced into the roll and permanently and rigidly connected thereto. The bearing 7 forms a chamber 8 in the end of the roll, said chamber 8 extending from the bearing 7 to the adjacent, the right-hand, end of the roll. In said chamber 8 is placed a sleeve 9 having an internal duplex thread 10. Said sleeve fits snugly in the chamber 8 and around the shaft, substantially filling the space between the shaft and the inner surface of the roll. The ends of the sleeve are closed except for the aperture through which the shaft extends, that is to say, the threads are closed at the ends of the sleeve and the two threads are directly connected together at each end of the sleeve so that the crescent switch, which will be presently described, when it reaches the end of one thread will be directed by the sleeve itself into the other thread in order to reverse the direction of movement of the roll. As shown in Figs. 4 to 7 inclusive, the threaded sleeve is divided longitudinally into the half sections 9ª and 9ᵇ which are adapted to be assembled together to form the complete sleeve. One of the half sections is provided with apertures 11 and the other section with pins 12, adapted to fit in the apertures 11 when the two halves of the sleeve are assembled. These pins and apertures hold the two members of the sleeve together against relative longitudinal movement and insure the proper registry of the thread sections in the two sleeve members when they are brought together and assembled within the roll.

Each end of each of the sleeve sections 9ª and 9ᵇ is formed with a bearing surface 9ᶜ which is adapted to engage the shaft 2 when the sections are assembled in working position. When the two parts of the sleeve are assembled the parts 9ᶜ form a continuous bearing surface around the shaft at each end of the sleeve. The threads in between the bearing surfaces 9ᶜ do not engage the shaft so that said threads will not be worn by the rotation of the roll around the shaft. The inwardly extending annular flanges which form the bearing surface 9ᶜ are so shaped on their inner sides, that is to say the sides within the sleeve, that they constitute the ends of the threads and form reversing cams which serve to divert the crescent switch from the end of one thread into the beginning of the other or reverse thread.

To cause the roll to reciprocate on the thread 2, a crescent switch 13 is pivotally or rotatably mounted in an aperture in the shaft and within the sleeve 9. The switch is formed with a stud 14 which passes through an aperture in the shaft and the end of said stud is threaded to receive a nut 15. The nut 15 fits in a recess in the shaft and clamps a washer 16 against a shoulder on the stud so that the switch is permanently mounted in the shaft but is free to oscillate or rotate on its stud. The switch is tapered toward its ends to facilitate its traveling in the duplex thread.

The internally threaded sleeve is rigidly locked to the distributor roll 1 by means of a longitudinally extending key 17. One of the sleeve sections 9ª is provided with a longitudinally extending key-way 18 to receive the key 17 and the ends of the key are formed with studs 19, one of which enters a corresponding aperture in the bearing ring 7 to lock the sleeve to the roll against rotation.

The end of the roll and the end of the chamber 8 is closed by a bearing ring 20 and said ring is formed at diametrically opposite points with outwardly extending lugs 21 which fit corresponding recesses formed in the ends of the roll so that said closure ring is locked to the roll against independent or relative rotation. The closure ring is secured rigidly to the end of the roll by means of screws 22 which pass through the lugs 21 and into the ends of the roll. The bearing ring on its inner face is formed with an aperture to receive the stud 19 formed on the outer end of the locking key 17 so that when the bearing ring 20 is secured in place the sleeve is rigidly connected to the roll by the studs 19 on the locking key.

The closure ring 20 is formed with an oil chamber 23 which surrounds the shaft and is adapted to deliver a lubricant thereto. Access is had to the oil chamber through a passage 24 in which is arranged an outwardly seating spring-pressed ball valve 25, said valve permitting oil to be introduced to said chamber and holding it therein. The closure ring is also provided with a passage 26 which communicates with the oil chamber and opens on the inner face of the closure ring closely adjacent the inner surface of the distributor roll. The sleeve section 9ᵇ is provided on its exterior with a longitudinally extending oil passage 27 which communicates at one end with the passage 26 and the oil chamber 23. The sleeve section 19 is also formed with transverse oil passages 28 which open through the inner surfaces of the duplex threads and deliver oil to said threads and to the shaft within the sleeve.

In assembling the device the crescent switch is first secured to the shaft. The sleeve sections are then assembled over the crescent switch with the switch in one of the threads of the sleeve, and the locking key 17 is then placed in position. The assembled sleeve and locking key are slid into the chamber 8 of the roll, one of the studs 19 on the locking key entering the aperture in the bearing ring 7. The closure ring 20 is placed in position at the end of the roll with the stud 19 in its aperture in said closure ring. The screws 22 are then secured in place to lock all of the assembled parts in operative position. The roll 1 will be rotated by contact with other rolls, or in any other manner, and during its rotation the crescent switch will follow one of the duplex threads thereby causing the roll to move longitudinally in one direction. When the crescent switch reaches the end of one thread it will engage the cam surfaces formed on the flange 9ᶜ and will be diverted into the other thread, thereby causing the roll to move longitudinally in the opposite direction.

In Figs. 10 to 13 inclusive, is shown a threaded sleeve divided transversely midway its ends to form two sleeve sections 29 and 30. The inner ends of these sleeve sections are formed with interlocking studs and sockets 31 to hold the sleeve sections against relative rotation. These sleeve sections are formed with a key-way 32 to receive the locking key 17, and also formed with an oil passage 33 to receive oil from the passage 26 of the closure ring 20. The sleeve sections 29 and 30 are formed with the bearing surfaces 34 which are adapted to engage the shaft 2 to hold the sleeve centrally thereon. The inwardly extending annular flanges forming the bearing surfaces 34 close the ends of the threads; and the inner surfaces of said flanges form reversing cams which cause the crescent switch to be diverted from the end of one thread into the beginning of the other thread precisely as described in connection with the construction shown in Figs. 1 to 7 inclusive.

For the purpose of oiling the crescent switch, the shaft is provided with a longitudinally extending passage 35 which runs from the end of the shaft into the transverse opening which receives the stem of the crescent switch. The outer end of this passage is enlarged and threaded to receive a tubular shell 36, in which is mounted a spring-pressed valve ball 37. By introducing oil through the valve opening, it will run through the crescent switch and thence around the stem to the head 13 and thence into the duplex thread of the sleeve 9. The opposite end of the shaft from that on which the crescent switch is mounted is provided with a longitudinally extending passage 38, whose inner end is divided and communicates with the interior of the roll through branch passages 39. The outer end of this passage 38 is enlarged to receive the threaded shell 40. In this shell is mounted a spring-pressed valve 41. If desired oil may be introduced into the passage 38, but said passage and the conecting passages 39 may be used for the discharge of a cleaning fluid. Sometimes it is desirable to introduce gasoline or other cleaning fluid into the roll for cleaning purposes, and the two passages 39 and 38 afford a ready means for the discharge of said fluid. When used for this purpose, of course, the valve 41 must be held open, and this may be done by inserting a small pin in order to lock the valve off its seat.

From the foregoing it will be seen that an ink distributor comprising a roll or drum adapted to be rotated about a suporting shaft, and reciprocated logintudinally upon the shaft, has been provided; that the means for imparting the reciprocatory motion to the roll or drum comprises a few strong and simply constructed parts which may be readily assembled and removed for purposes of repair or renewal; and that the roll-reciprocatory mechanism is adapted to be mounted entirely within the interior of the roll or drum without the employment of fastening means extending through the periphery of the roll.

What I claim is:

1. An ink distributor comprising a shaft, a distributing roll slidably and revolubly mounted on said shaft and formed with a chamber at one end, a sectional sleeve fitting within said chamber and provided with an internal duplex thread wholly within said sleeve, means for locking the sleeve to the roll to rotate therewith, means for confining the sleeve within the chamber, and a crescent switch pivotally mounted on said shaft and engaging the duplex thread of the sleeve.

2. An ink distributor comprising a shaft, a distributing roll slidably and revolubly mounted on said shaft, a sectional sleeve fitting within said roll and formed with an internal duplex thread, each of said sleeve sections being formed with an inwardly extending annular flange at its outer end said flange closing the ends of the threads and forming bearing surfaces adapted to engage the shaft to center the sleeve sections thereon, a crescent switch pivotally mounted on the shaft and adapted to operate in said duplex thread, and means for preventing relative longitudinal movement between the sleeve and the roll said means locking the sleeve sections to the roll to prevent relative rotary movement between the sleeve and the roll.

3. An ink distributor comprising a shaft, a distributing roll slidably and revolubly mounted on said shaft and formed with a chamber at one end, a sectional sleeve fitting within said chamber and provided with an internal duplex thread wholly within said sleeve, a longitudinally extending locking key engaging the sleeve and the roll to lock the sleeve to the roll, means for confining the sleeve within the chamber, and a cresent switch pivotally mounted on said shaft and engaging the duplex thread of the sleeve.

4. An ink distributor comprising a shaft, a distributing roll slidably and revolubly mounted on said shaft and formed with a chamber at one end, a sectional sleeve fitting within said chamber and provided with an internal duplex thread wholly within said sleeve, one of said sleeve sections being formed with a longitudinally extending key-way, a longitudinally extending key adapted to fit in said key-way, studs formed on the ends of said key one of said studs being adapted to engage a rigid part of the roll, a closure ring adapted to close the end of the roll and confine the sleeve within the said chamber said ring being provided with an aperture to receive one of the studs on the locking key, means for securing the closure ring in place, and a crescent switch pivotally mounted on said shaft and engaging the duplex thread of the sleeve.

5. An ink distributor comprising a shaft, a distributing roll slidably and revolubly mounted on said shaft and formed with a chamber at one end, a sleeve fitting within said chamber and provided with an internal duplex thread, means for locking the sleeve to the roll, a closure ring to close the end of the roll and confine the sleeve within the said chamber said ring being formed with an oil chamber and the sleeve being formed with oil passages connected to the chamber in said closure ring, and a crescent switch pivotally mounted on said shaft and engaging the duplex thread of the sleeve.

6. An ink distributor comprising a shaft, a distributing roll slidably and revolubly mounted on said shaft, a sectional sleeve fitting within said roll and provided with an internal duplex thread wholly within the sleeve, the ends of said threads being closed by the ends of the sleeve, means for locking the sleeve to the roll to rotate therewith, and a crescent switch pivotally mounted on said shaft and engaging the duplex thread of the sleeve.

7. An ink distributor comprising a shaft, a distributing roll slidably and revolubly mounted on said shaft, a sleeve fitting within said roll and provided with an internal duplex thread, means for locking the sleeve to the roll, a crescent switch formed with a bearing stem extending transversely in an aperture in the shaft, the head of said switch engaging the duplex thread of the sleeve, the shaft being formed with an oil passage extending from the end of the shaft to the transverse aperture in which the crescent switch stem is mounted, and a valve closing the outer end of said oil passage.

8. An ink distributor comprising a shaft, a distributing roll slidably and revolubly mounted on said shaft, a sleeve fitting within said roll and provided with an internal duplex thread, means for locking the sleeve to the roll, a crescent switch formed with a bearing stem extending transversely in an aperture in the shaft, the head of said switch engaging the duplex thread of the sleeve, a shaft being formed with a passage extending longitudinally inwardly from the end of the shaft and communicating with the interior of the roll through a transverse passage, and a valve closing the outer end of said passage.

In testimony whereof I hereunto affix my signature.

WILLIAM JACOB RAMSAIER.